United States Patent [19]
Watanabe

[11] Patent Number: 5,761,016
[45] Date of Patent: Jun. 2, 1998

[54] MAGNETIC DISK CARTRIDGE

[75] Inventor: Seiichi Watanabe, Kanagawa-ken, Japan

[73] Assignees: Fuji Photo Film Co., Ltd., Tokyo, Japan; Iomega Corporation, Roy, Utah

[21] Appl. No.: 708,304

[22] Filed: Sep. 4, 1996

[51] Int. Cl.$^6$ ................................................ G11B 23/03
[52] U.S. Cl. ............................................ 360/133; 369/291
[58] Field of Search ........................... 360/133; 369/291, 369/282

[56] References Cited

U.S. PATENT DOCUMENTS

| | | | |
|---|---|---|---|
| 4,847,826 | 7/1989 | Sakaguchi et al. | 369/270 |
| 4,920,441 | 4/1990 | Kimura et al. | 360/133 |
| 5,315,470 | 5/1994 | Fujino et al. | 360/133 |
| 5,587,994 | 12/1996 | Nagaura et al. | 369/291 |

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

A magnetic disk cartridge includes a magnetic disk, a cassette shell encasing the magnetic disk, and a disk-shaped center core which supports the magnetic disk and is adapted for rotation by a turntable equipped with an annular chucking magnet. A magnetic head access opening is formed in one side surface of the cassette shell, a center portion of the center core is formed with a center hole for engagement by a center locating pin of the turntable, and a peripheral portion of the center core is formed with a step-like annular chucking region whose level differs from that at the mouth of the center hole. The chucking region is adapted to make surface contact with the annular chucking magnet. The structure enables the chucking magnet to strongly attract and reliably secure the center core, thereby preventing slippage during high-speed rotation, and to prevent rotational vibration owing to unbalanced loading.

4 Claims, 2 Drawing Sheets

MAGNETIC DISK CARTRIDGE

BACKGROUND OF THE INVENTION

1. Field of the Invention

The present invention relates to a magnetic disk cartridge and, more particularly, to the structure of a center core for supporting the center portion of the magnetic disk of a magnetic disk cartridge having a rotatable magnetic disk encased in a cassette shell.

2. Description of the Related Art

A magnetic disk cartridge comprises a magnetic disk for magnetically recording analog and/or digital signals and which is rotatably encased in a thin cassette shell. The cassette shell is formed in the shape of a flat prism (substantially a hexahedron) with a top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter member for preventing invasion of dust and the like when the magnetic disk cartridge is not in use.

The magnetic head access opening of the prior art magnetic disk cartridge is a slender opening of substantially rectangular shape formed in the top and bottom surfaces of the cassette shell to extend in the radial direction of the magnetic disk.

However, it is not absolutely necessary for the magnetic head access opening to be formed in the top and bottom surfaces of the cassette shell to extend in the radial direction of the magnetic disk. Specifically, it can be provided at any location so long as it enables the magnetic heads to be brought in contact with, or close to, the opposite surfaces of the magnetic disk over the full radius thereof from the exterior. The opening is preferably as small as possible so as to minimize invasion of dust into the cartridge. The ability to fabricate smaller magnetic heads has afforded greater freedom in the positioning and sizing of the magnetic head access opening and has even made it possible to realize the desired small magnetic head access opening by providing the opening only in a side surface rather than in the top and/or bottom surface. This can be achieved by forming a narrow side surface of the cassette shell with a magnetic head access opening of a size enabling access to the opposite surfaces of the magnetic disk from the exterior and inserting/withdrawing thin, arm-shaped pickups having tiny magnetic heads attached at their tips through this hole to conduct recording and reproduction while moving the pickups in the radial direction of the magnetic disk.

Such a magnetic disk cartridge having the magnetic head access opening formed in one side surface can accommodate a high-density, high-capacity magnetic disk. Since such a magnetic disk requires a high recording density and a high data transfer rate, it is adapted to conduct recording and reproducing while being rotated at high speed (several thousand rpm).

The center portion of the magnetic disk of the conventional thin magnetic disk cartridge is also supported by a center core made of ferromagnetic sheet material and the center core is rotated by a turntable which secures it in place by magnetic attraction. In order to prevent eccentric rotation, the center core is formed with a polygonal hole at its center and with a separate polygonal hole at a peripheral portion.

A magnetic disk cartridge whose magnetic disk is rotated at high speed cannot tolerate rotational offset owing to slippage occurring between the turntable and the magnetic disk at the start or in the course of rotation and requires the magnetic disk to be rotated in a single plane (with a high degree of flatness).

Prevention of slippage by the method adopted in the conventional magnetic disk cartridge, i.e., by providing a polygonal hole at a location apart from the center, is not practical because the presence of the hole causes a load imbalance in the rotational plane and results in rotational vibration during high-speed rotation. If this were the only point to be considered, it would be preferable to suppress vibration of a magnetic disk cartridge that rotates at high speed by providing its center core with only one hole at the center. In this case, however, the transmission of torque from the turntable to the center core relies solely on chucking utilizing the attractive force of a chucking magnet and, as pointed out above, the likelihood of slippage occurring between the turntable and the center core at the start or in the course of rotation is increased.

In order to maintain flatness and reduce modulation in a conventional magnetic disk cartridge during rotation, it is possible to adopt a known structure, such as described in JU-A 61-24877, in which the contact surface of the center core is depressed toward the center hole. Since this structure results in tangential contact between the center core and the magnet, however, it is liable to experience rotational offset (slippage) owing to insufficient magnetic attraction if applied to a high-speed magnetic disk cartridge.

SUMMARY OF THE INVENTION

The object of this invention is to overcome the aforesaid problems by providing a magnetic disk cartridge wherein the center core of the magnetic disk can be chucked by the chucking magnet of a turntable to enable high-speed rotation of the center core without rotational slippage and with minimal vibration.

For achieving this object, the invention provides a magnetic disk cartridge comprising a magnetic disk, a cassette shell encasing the magnetic disk to be rotatable therein, and a disk-shaped center core fabricated from sheet material which supports the center of the magnetic disk and is exposed through an open portion in the bottom surface of the cassette shell for rotation by a turntable equipped at an outer peripheral portion thereof with an annular chucking magnet for magnetically chucking the center core, wherein the cassette shell is formed as a flat prism with a top surface slightly larger than the magnetic disk, the bottom surface of approximately the same shape as, and lying parallel to, the top surface, and narrow side surfaces extending between outer peripheral edges of the top and bottom surfaces, a magnetic head access opening is formed in one side surface of the cassette shell for enabling magnetic reproducing and recording heads to be brought in contact with, or close to, opposite surfaces of the magnetic disk from the exterior, a center portion of the center core is formed with a center hole for engagement by a center locating pin of the turntable, and a peripheral portion of the center core is formed with a step-like annular chucking region whose level differs from that at a mouth of the center hole and which is adapted to make surface contact with the annular chucking magnet.

DETAILED DESCRIPTION OF THE PREFERRED EMBODIMENT

Figure 1:
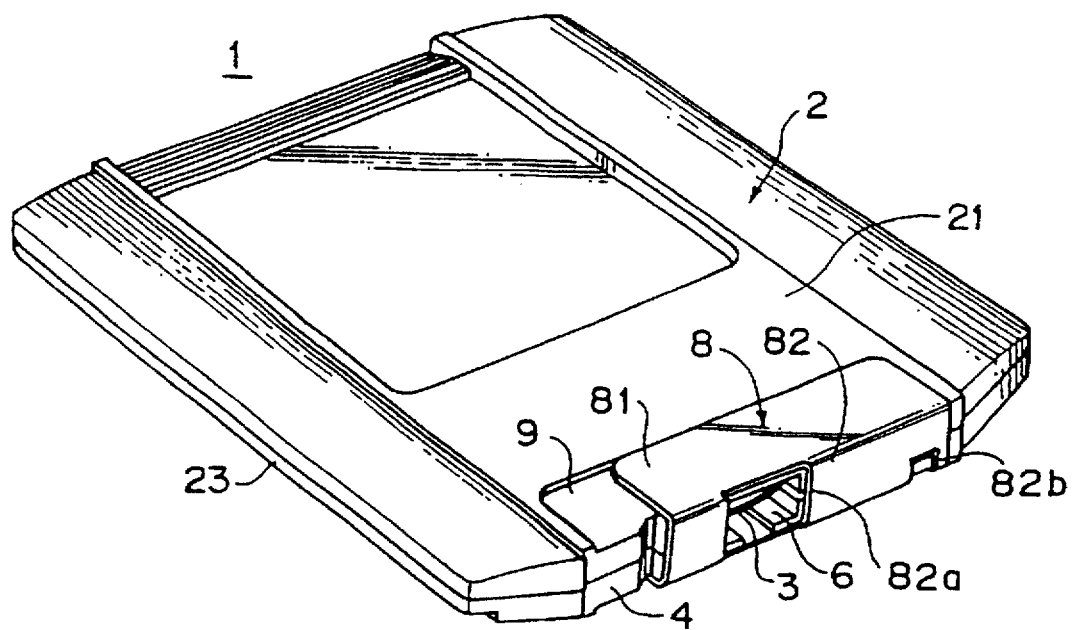
FIG. 1 is a top perspective view of a magnetic disk cartridge which is an embodiment of the invention shown with its shutter member open.
Figure 2:
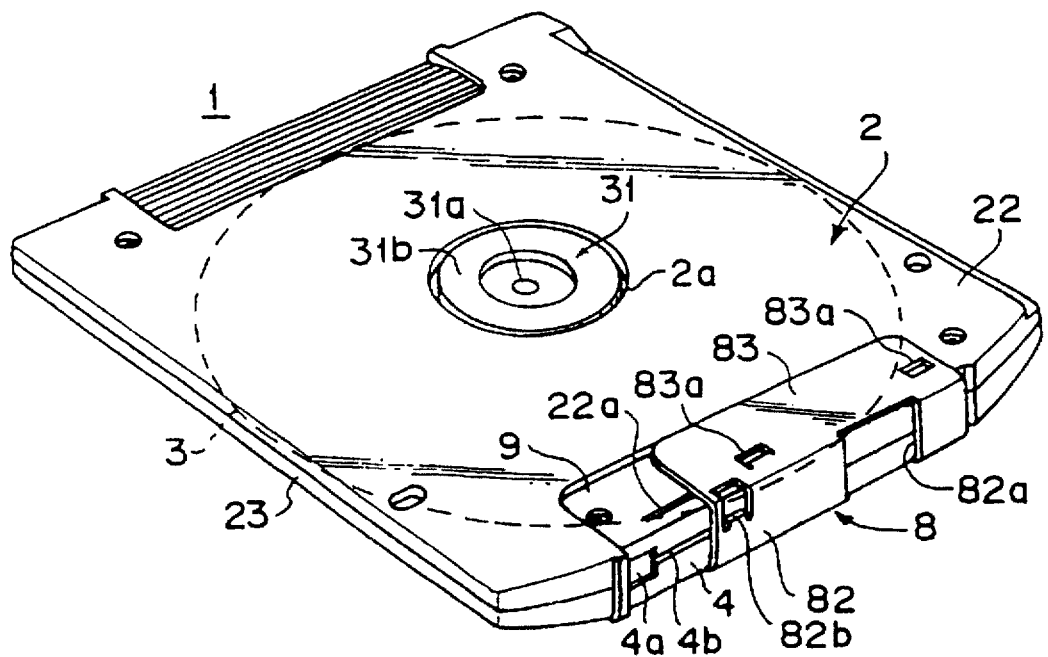
FIG. 2 is a bottom perspective view of the magnetic disk cartridge of FIG. 1 shown with its shutter member closed.
Figure 3:
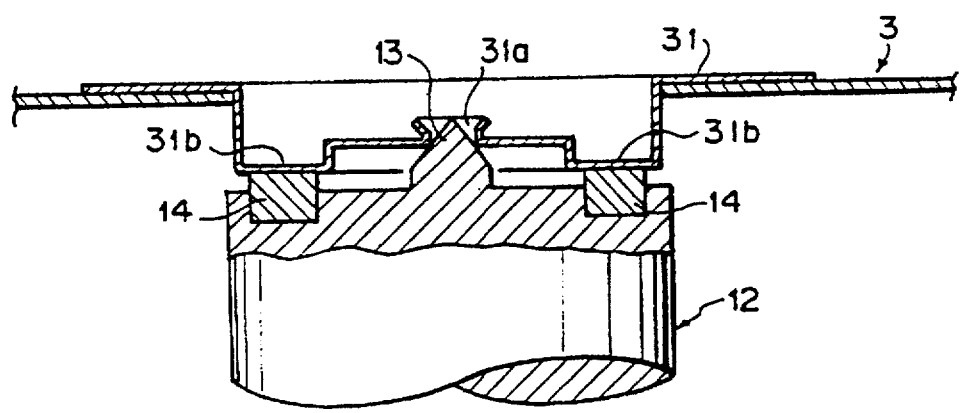
FIG. 3 is a sectional view of an essential portion of the magnetic disk cartridge of FIG. 1 showing its magnetic disk magnetically chucked to a turntable.

The magnetic disk cartridge of the present invention will hereinbelow be described with reference to the accompanying drawings. FIGS. 1 to 3 show a magnetic disk cartridge which is an embodiment of the invention. The magnetic disk cartridge is shown in perspective view from the top with its shutter member open in FIG. 1 and from the bottom with its shutter member closed in FIG. 2. FIG. 3 is a sectional view showing the magnetic disk of the magnetic disk cartridge magnetically chucked to a turntable.

The magnetic disk cartridge 1 of this embodiment comprises a cassette shell 2 encasing a magnetic disk 3 so as to be freely rotatable therein. The cassette shell 2 is formed of a pair of top and bottom cassette shell halves made of molded plastic. The cassette shell 2 is formed substantially as a flat hexahedron having an approximately square top surface 21 slightly larger than the magnetic disk 3 encased therein, a bottom surface 22 of substantially the same shape as the top surface 21 and lying parallel thereto, and narrow side surfaces 23 extending between the outer peripheral edges of the top surface 21 and the bottom surface 22.

The center portion of the magnetic disk 3 (recording medium) is supported by a disk-shaped center core 31 pressed from ferromagnetic sheet material. The center core 31 faces into a circular opening 2a in the bottom surface 22 of the cassette shell 2 (see FIG. 2).

When the magnetic disk cartridge is loaded in a magnetic recording and reproducing device, the center core 31 is chucked by a turntable 12, as shown in FIG. 3, and rotated at high speed. The turntable 12 is formed at the center of rotation with a locating pin 13 having a tapered tip and at an outer peripheral portion with an annular chucking magnet 14.

The center core 31 is formed at a center portion with a center hole 31a for engagement by the locating pin 13 of the turntable 12 and at an outer peripheral portion with an annular, step-like chucking region 31b whose level differs from that at the mouth of the center hole 31a. The chucking region 31b is adapted to make surface-to-surface contact with the annular chucking magnet 14 at the outer peripheral region of the turntable 12.

A magnetic head access opening 6 enabling magnetic recording and reproducing heads to be brought in contact with, or close to, the opposite surfaces of the magnetic disk 3 from the exterior is formed in one side surface 4 among the four side surfaces 23 of the cassette shell 2.

A slidable shutter member 8 for opening and closing the magnetic head access opening 6 is provided on the cassette shell 2. The shutter member 8 is constituted as a sectionally u-shaped metal sheet member comprising, as interconnected, an upper wing 81 extending along the top surface 21, a shutter section 82 extending along the one side surface 4 and a lower wing 83 extending along the bottom surface 22. The shutter member 8 moves along these surfaces. The shutter section 82 is provided with a shutter window 82a. It can therefore open and close the magnetic head access opening 6 depending on whether the magnetic disk cartridge 1 is in storage or operation.

On the other hand, portions of the top surface 21, the side surface 4 and the bottom surface 22 of the cassette shell 2 adjacent to the magnetic head access opening 6 are formed with a shallow recess 9 for retaining and guiding the upper wing 81, the shutter section 82 and the lower wing 83 of the shutter member 8.

The shutter member 8 is constantly biased in the direction of closing the magnetic head access opening 6 by a shutter closing spring (a torsion spring not shown in the drawings). The shutter closing spring is inserted into the cassette shell 2 through a spring insertion opening 4a formed at one end portion of the side surface 4 of the cassette shell 2, a first end portion thereof engages with a spring engaging portion 82b provided at a lateral end portion of the shutter section 82 of the shutter member 8, and the other end portion thereof engages with the inner surface of the cassette shell. The spring engaging portion 82b of the shutter member 8 passes through a slide groove 4b formed in the side surface 4 of the cassette shell 2. The lower wing 83 of the shutter member 8 is formed at two locations with projecting guide claws 83a, 83a that engage with a guide groove 22a formed in the bottom surface 22 of the cassette shell 2 to extend in the sliding direction of the shutter member 8, thereby retaining the shutter member 8 on the cassette shell 2.

The magnetic disk cartridge 1 of this embodiment is used in the same manner as the prior-art magnetic disk cartridge. Specifically, it is loaded into the magnetic recording and reproducing device (hereinafter called simply "device") in the state shown in FIG. 2, i.e., with the magnetic head access opening 6 closed by the shutter member 8. At this time, an operating member provided in the device responds to the loading operation by sliding the shutter member 8 to the open position shown in FIG. 1. Then, when the operator performs a prescribed operation for removing the magnetic disk cartridge 1 from the device, for instance, when the operator presses a prescribed operating button of the device, the shutter member 8 is closed to the position shown in FIG. 2.

Since various types of device side mechanisms are available for conducting the opening and closing operations of the shutter member 8 and such a mechanism can easily be constituted as in conventional devices, a detailed explanation of such a mechanism will not be given here.

When the magnetic disk cartridge 1 is loaded in a device of the foregoing type, the device responds by moving the turntable 12 toward the center core 31 exposed at the bottom surface 22 of the cassette shell 2. Specifically, the tip of the locating pin 13 of the turntable 12 is engaged with center hole 31a of the center core 31 to regulate the position of the center of the center core 31 and, consequently, that of the magnetic disk 3, while the chucking surface of the chucking magnet 14 at the outer periphery of the turntable 12 is brought into surface-to-surface contact with the chucking region 31b of the center core 31 so as to strongly attract and secure the center core 31 at an annular region thereof. As a result, the turntable 12 can rotate the magnetic disk 3 with little or no slippage (offset) in the direction of rotation.

Since the invention provides the magnetic head access opening of the magnetic disk cartridge in one side surface of the cassette shell, the magnetic head access opening can be made small to minimize invasion of dust and the like into the interior of the cartridge. Moreover the center core of the magnetic disk cartridge is formed with a hole at only at its center. Owing to this center hole, the center of rotation of the magnetic disk can be regulated by engagement of the locating pin of the turntable with the center hole, while the absence of any other hole ensures excellent rotational balance, thereby enabling the magnetic disk to be rotated at high speed with minimal rotational vibration and high-performance recording and reproducing to be conducted with little modulation.

In addition, turntable torque is transmitted to the center core through an annular chucking magnet which is provided at an outer peripheral region of the turntable and magnetically chucks an annular chucking region of the center core. Since the torque is therefore transmitted at high efficiency to enable obtainment of a large driving force, the magnetic disk can be rotated without occurrence of slippage between the turntable and the center core at the start or in the course of rotation. This enables excellent recording and reproduction to be conducted by use of magnetic heads. Further, since the chucking region of the center core is formed as an annular, step-like region on a different level from that at the mouth of the center hole, contact of the chucking magnet with portions it should not contact is positively avoided, the center core can be reliably seated by magnetic chucking, and a large chucking force can be secured through surface-to-surface contact.

The stepped configuration defining the mouth of the center hole and the chucking region of the center core at different levels is also advantageous in that it increases the rigidity of the center core, thereby minimizing deformation under exposure to external force, and enables the prescribed shape to be maintained with high precision after fabrication. Since the chucking region therefore has the high flatness required for broad surface-to-surface contact with the chucking magnet, it is strongly chucked by the chucking magnet to prevent rotational offset with high reliability.

What is claimed is:

1. A magnetic disk cartridge comprising:

a magnetic disk, a cassette shell encasing the magnetic disk to be rotatable therein, and a disk-shaped center core fabricated from sheet material which supports the center of the magnetic disk and is exposed through an open portion in a bottom surface of the cassette shell for rotation by a turntable equipped at an outer peripheral portion thereof with an annular chucking magnet for magnetically chucking the center core, wherein the cassette shell is formed as a flat prism with a top surface slightly larger than the magnetic disk, the bottom surface of approximately the same shape as, and lying parallel to, the top surface, and narrow side surfaces extending between outer peripheral edges of the top and bottom surfaces, a magnetic head access opening is formed in one of said narrow side surfaces of the cassette shell for enabling magnetic reproducing and recording heads to be brought in contact with, or close to, opposite surfaces of the magnetic disk from the exterior, a center portion of the center core is formed with a turntable engaging center hole which engages with a center locating pin of the turntable when the center core of the magnetic disk cartridge is chucked by the turntable, and a peripheral portion of the center core is formed with a step-like annular chucking region whose level differs from that at a mouth of the center hole and which makes surface contact with the annular chucking magnet when the center core of the magnetic disk cartridge is chucked by the turntable.

2. A turntable which is adapted to a device, wherein a magnetic disk cartridge as defined in claim 1 is loaded, and which chucks and rotates the center core of the magnetic disk, comprising:

a locating pin having a tapered tip which is formed at the center of rotation of the turntable, and an annular chucking magnet which is formed at an outer peripheral portion of the turntable.

3. A turntable as defined in claim 2, wherein, when the magnetic disk cartridge is loaded in the device, the tapered tip of the locating pin is engaged with the center hole of the center core to regulate the position of the center of the center core and that of the magnetic disk.

4. A turntable as defined in claim 2, wherein, when the magnetic disk cartridge is loaded in the device, the annular chucking magnet magnetically chucks the chucking region of the center core, and turntable torque is transmitted to the center core through said annular chucking magnet.

* * * * *